(12) United States Patent
Marumo

(10) Patent No.: US 6,752,855 B2
(45) Date of Patent: Jun. 22, 2004

(54) SOLUTION TREATMENT SYSTEM AND SOLUTION TREATMENT METHOD

(75) Inventor: Yoshinori Marumo, Nirasaki (JP)

(73) Assignee: Tokyo Electron Limited, Tokyo (JP)

( * ) Notice: Subject to any disclaimer, the term of this patent is extended or adjusted under 35 U.S.C. 154(b) by 0 days.

(21) Appl. No.: 10/158,217

(22) Filed: May 31, 2002

(65) Prior Publication Data

US 2003/0000893 A1 Jan. 2, 2003

(30) Foreign Application Priority Data

Jun. 1, 2001 (JP) ...................................... P2001-167403

(51) Int. Cl.⁷ ............................................. B01D 19/00
(52) U.S. Cl. ........................... 95/241; 96/155; 204/237; 204/238; 366/241; 366/348
(58) Field of Search ............................ 95/241; 96/155; 204/80, 81, 157; 205/237, 238, 471, 602; 366/241, 348; 210/85, 96.1, 167, 188, 739, 805

(56) References Cited

U.S. PATENT DOCUMENTS

| | | | | |
|---|---|---|---|---|
| 3,623,962 A | * | 11/1971 | Beale | |
| 4,229,280 A | * | 10/1980 | Horn | |
| 6,113,769 A | * | 9/2000 | Uzoh et al. | 205/101 |
| 6,258,244 B1 | * | 7/2001 | Ohmi et al. | 205/80 |
| 6,379,520 B1 | * | 4/2002 | Kuriyama et al. | 205/81 |

* cited by examiner

*Primary Examiner*—Joseph Drodge
(74) *Attorney, Agent, or Firm*—Pillsbury Winthrop LLP (57) ABSTRACT

A plating system comprises: a plating unit which plates a water; a plating solution storage tank which stores a plating solution; and a plating solution supply system which supplies the plating solution in the plating solution storage tank to the plating unit. A dissolved oxygen removing unit which removes dissolved oxygen from the plating solution flowing in the plating solution supply system is provided in the middle of the plating solution supply system.

7 Claims, 6 Drawing Sheets

SOLUTION TREATMENT SYSTEM AND SOLUTION TREATMENT METHOD

BACKGROUND OF THE INVENTION

1. Field of the Invention

The present invention relates to a solution treatment system provided with a solution treatment unit which gives a solution treatment to a substrate such as a semiconductor wafer and to a solution treatment method.

2. Description of the Related Art

In recent years, wiring which constitutes a semiconductor device has been made more microscopic owing to the improvement in the degree of integration of the semiconductor device. With this, the forming technique of the microscopic wiring and securing of its reliability have become important objects. As one of means for attaining these objects, an embedded wiring method which forms wiring by embedding a metal in trenches or connection holes formed in a semiconductor wafer (hereinafter, simply referred to as a "wafer") has come to the force.

As a unit which can carry out such an embedded wiring method, a plating unit which embeds a metal by electrolytic plating in trenches or connection holes formed in a wafer is known. In this plating unit, the metal is embedded in the trenches or the connections holes of the wafer by applying a voltage between a pair of electrodes while the wafer is in contact with a plating solution.

In the plating unit as described above, when the metal is embedded in the trenches or the connection holes of the wafer, an additive contained in the plating solution is consumed with the elapse of time to lower an embedding speed. This reduction in the embedding speed causes decrease in throughput. Therefore, the plating solution, after used for a certain period, is replaced by a new plating solution to suppress the decrease in throughput.

There exists, however, such a problem that the plating solution has to be replaced frequently since the embedding speed starts to lower in a short time.

SUMMARY

It is an object of the present invention to provide a solution treatment system and a solution treatment method which can decrease the frequency of replacing a treatment solution by suppressing reduction in solution treatment speed.

A solution treatment system of the present invention comprises: a solution treatment unit which includes a treatment solution tank to store a treatment solution and a pair of electrodes and which gives a solution treatment to a substrate; a treatment solution storage tank which stores the treatment solution; a treatment solution supply system which supplies the treatment solution stored in the treatment solution storage tank to the solution treatment unit; and a dissolved oxygen removing unit which is disposed in the middle of the treatment solution supply system and which removes dissolved oxygen from the treatment solution flowing in the treatment solution supply system. Since the solution treatment system of the present invention is provided with the dissolved oxygen removing unit, the reduction in solution treatment speed can be suppressed to decrease the frequency of replacing the treatment solution.

It is preferable that the solution treatment system described above further comprises: a treatment solution stirring system which stirs the treatment solution stored in the treatment solution storage tank; and a dissolved oxygen removing unit which in disposed in the middle of the treatment solution stirring system and which removes the dissolved oxygen from the treatment solution flowing in the treatment solution stirring system. By providing the treatment solution stirring system and the dissolved oxygen removing unit, the reduction in the solution treatment speed can be further suppressed.

Another solution treatment system of the present invention comprises; a solution treatment unit which includes a treatment solution tank to store a treatment solution and a pair of electrodes and which gives a solution treatment to a substrate; a treatment solution storage tank which stores the treatment solution; a treatment solution supply system which supplies the solution treatment unit with the treatment solution stored in the treatment solution storage tank; a treatment solution stirring system which stirs the treatment solution stored in the treatment solution storage tank; and a dissolved oxygen removing unit which is disposed in the middle of the treatment solution stirring unit and which removes dissolved oxygen from the treatment solution flowing in the treatment solution supply system. Since the solution treatment system of the present invention is provided with the dissolved oxygen removing unit, the reduction in the solution treatment speed can be suppressed to decrease the frequency of replacing the treatment solution.

It is preferable that the solution treatment system described above further comprises a housing accommodating the treatment solution storage tank and an inert gas supply system which supplies an inert gas into an inner part of the housing. The inert gas of the present invention means a nonoxide gas. Specifically, for example, a rare gas such as helium, neon, argon, xenon, and krypton or nitrogen can be named. By providing the housing and the inert gas supply system, oxygen is not easily taken into the treatment solution.

It is preferable that the solution treatment system described above further comprises a dissolved oxygen measuring unit which measures the concentration of the dissolved oxygen contained in the treatment solution. By providing the dissolved oxygen measuring unit, the concentration of the dissolved oxygen can be accurately controlled.

It is preferable that the treatment solution used in the above-described solution treatment system contains an additive. As the additive contained in the treatment solution, for example, a sulfur compound can be named. As the sulfur compound, for example, an organic bivalent sulfur compound can be named. By including the additive in the treatment solution, the solution treatment speed can be made higher. Furthermore, even when the additive is contained in the treatment solution, the consumption of the additive can be suppressed.

The treatment solution used in the above-described solution treatment system may be a plating solution. The use of the plating solution as the treatment solution makes it possible to plate the substrate.

A solution treatment method of the present invention comprises: a dissolved oxygen removing step of removing dissolved oxygen from a treatment solution in a treatment solution storage tank; a treatment solution supply step of supplying a treatment solution tank with the treatment solution from which the dissolved oxygen is removed; and a solution treatment step of bringing a substrate into contact with the treatment solution supplied to the treatment solution tank and passing an electric current through the substrate to give a solution treatment to the substrate. Since the solution treatment method of the present invention comprises the dissolved oxygen removing step, the reduction in solution treatment speed can be suppressed to decrease the frequency of replacing the treatment solution.

The dissolved oxygen removing step described above may be carried out when the treatment solution is supplied to the treatment solution tank. Carrying out the dissolved oxygen removing step when the treatment solution is supplied to the treatment solution tank makes it possible to surely suppress the reduction in the solution treatment speed.

The dissolved oxygen removing step described above may be carried out when the treatment solution in the treatment solution storage tank is stirred. Carrying out the dissolved oxygen removing step when the treatment solution in the treatment solution storage tank is stirred makes it possible to further suppress the reduction in the solution treatment speed.

It is preferable that the solution treatment method described above further comprises an inert gas supply step of supplying an inert gas into an inner part of a housing accommodating the treatment solution storage tank. When the inert gas supply step is included, oxygen is not easily taken into the treatment solution.

DETAILED DESCRIPTION

Figure 1:
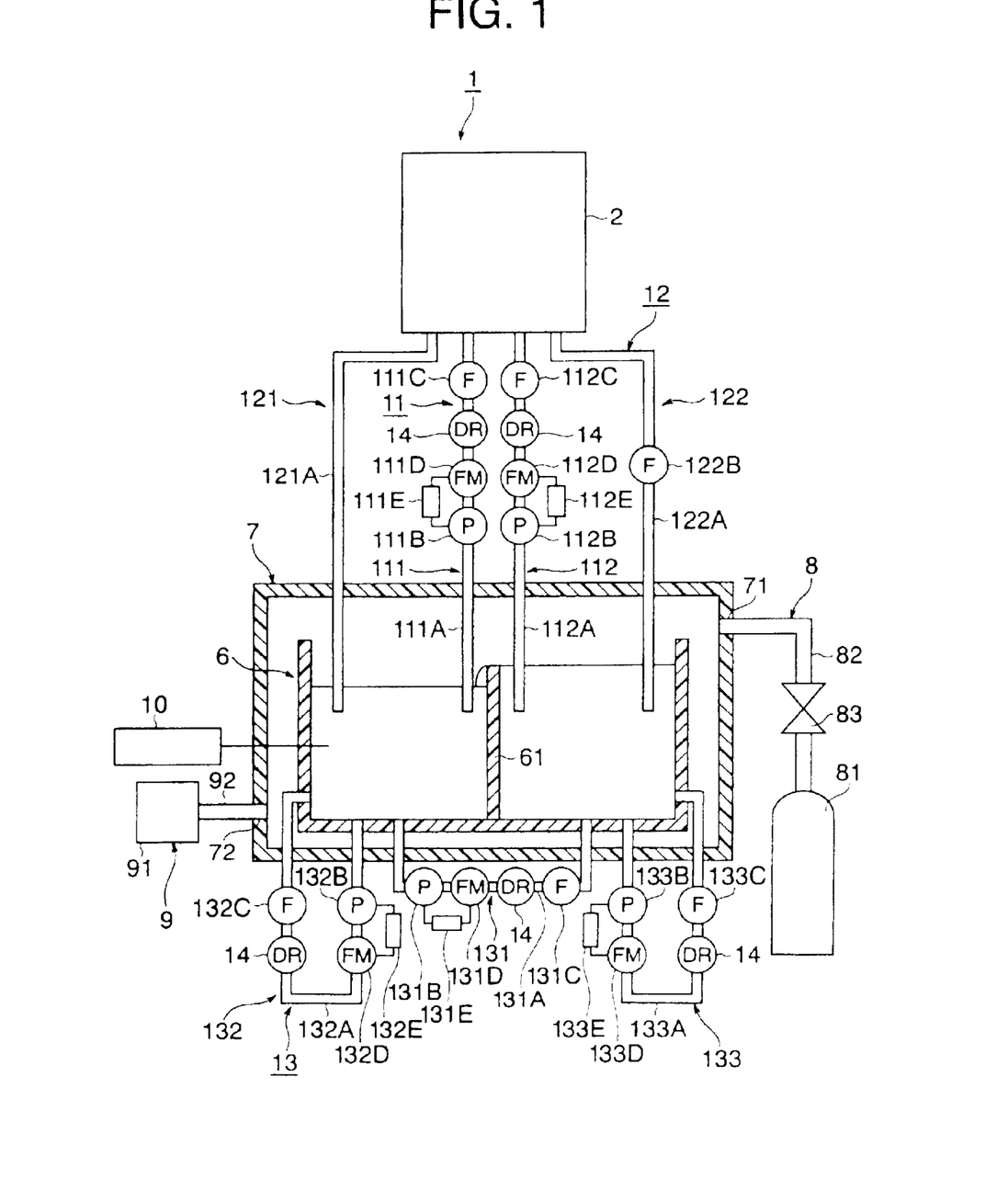
FIG. 1 in a view schematically showing the structure of a plating system according to an embodiment.

A plating system according to the present invention will be explained below. FIG. 1 is a view schematically showing the structure of a plating system according to an embodiment, FIG. 2 is a schematic vertical sectional view of a plating unit according to the embodiment, and FIG. 3 is a schematic plan view of the inside of the plating unit according to the embodiment.

Figure 2:
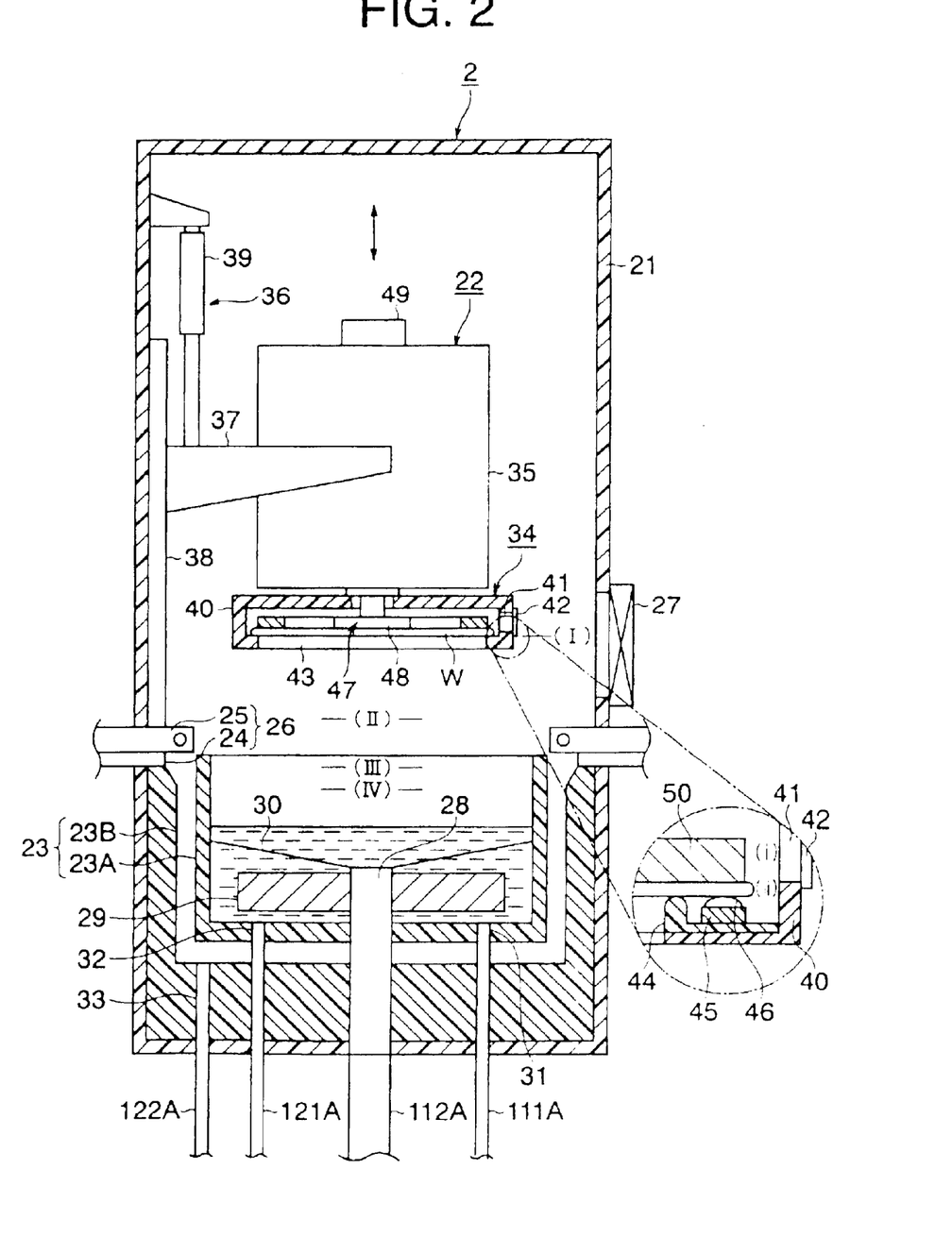
FIG. 2 is a schematic vertical sectional view of a plating unit according to the embodiment.
Figure 3:
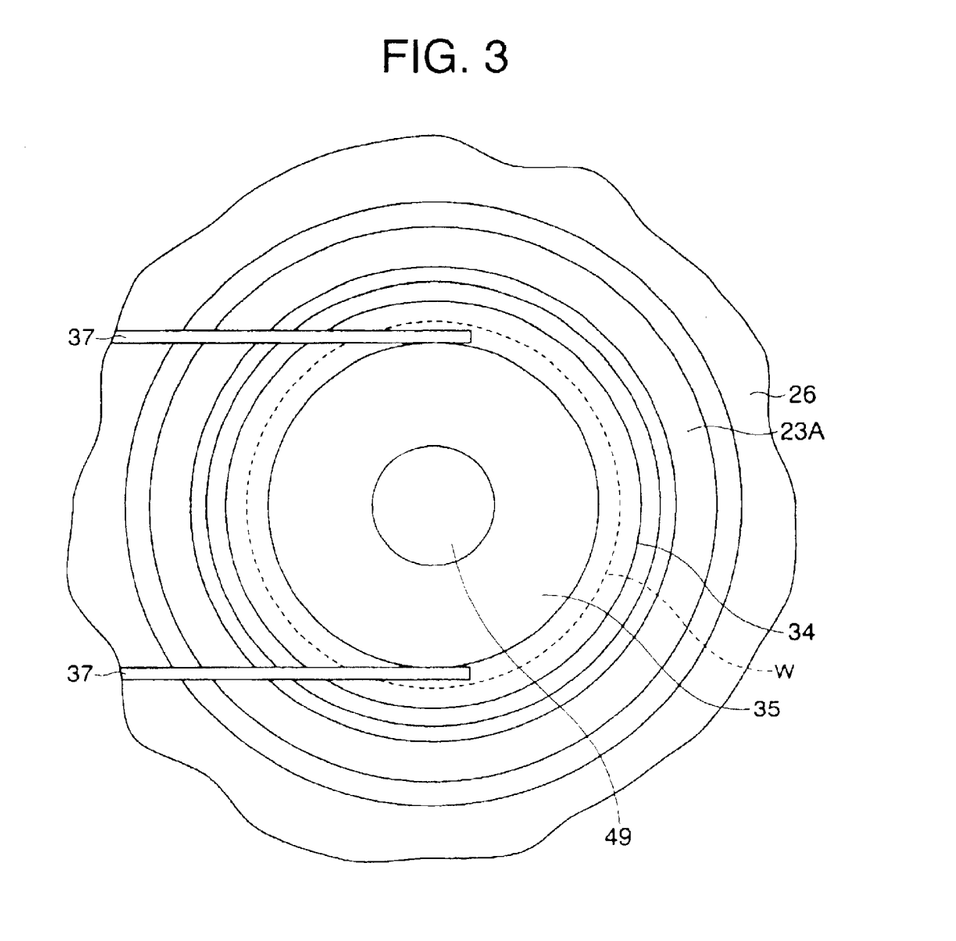
FIG. 3 is a schematic plan view of the inside of the plating unit according to the embodiment.

As shown in FIG. 1 to FIG. 3, a plating system 1 includes a plating unit 2 to plate a wafer W and a plating solution storage tank 6 which stores a plating solution used in the plating unit 2.

Hereinafter, the plating unit 2 will be explained. The plating unit 2 is covered with a housing 21 made of a synthetic resin. Inside the housing 21, a driver 22 which holds a wafer W and a plating solution tank 23 which stores the plating solution are mainly provided. In this embodiment, the driver 22 is disposed directly above the plating solution tank 23.

In the housing 21 near an upper part of the plating solution tank 23, a separator 26 having therein an exhaust port 24 which sucks an evaporated plating solution or a scattered plating solution and a cleaning nozzle 5 which cleans the plating applied onto the wafer W is disposed. A through hole is provided in the center of this separator 26 so as to enable the driver 22 to move between a transfer position (I) and a plating position (IV) which will be explained later. Furthermore, a gate valve 27 which allows the wafer W to be carried into/out of the plating unit 1 is provided near the later-explained transfer position (I) in the housing 21.

The plating solution tank 23 is, for example, a dual tank consisting of an inner tank 23A to be filled with the plating solution and an outer tank 23B to which the plating solution overflowing from the inner tank 23A flows. The inner tank 23A is formed in a substantially cylindrical shape with its upper surface open and its bottom surface closed. A blowout pipe 28 which blows out the plating solution protrudes from a bottom part of the inner tank 23A.

On the circumference of the blowout pipe 28, an anode electrode 29 in a substantially disc shape is disposed coaxially with the inner tank 23A. The anode electrode 29 is electrically connected to a not-shown external power supply which is provided outside the housing 21. Note that a voltage is applied between the anode electrode 29 and a later-described cathode electrode 45 in order to plate a surface to be plated of the wafer W.

A diaphragm 30 dividing the inner tank 23A into an upper region and a lower region is provided between an end portion of the blowout pipe 28 and the inner tank 23A above the anode electrode 29. The diaphragm 30 is structured to pass ions therethrough but not to pass therethrough impurities which are produced at the time the anode electrode 29 is dissolved and bubbles, for example, oxygen and hydrogen which are produced during the plating. Here, the upper region of the inner tank 23A and the lower region of the inner tank 23A which are separated by the diaphragm 30 will be hereinafter referred to as a cathode region and an anode region respectively.

Openings 31, 32 are formed in the bottom part of the inner tank 23A and later described pipes 111A, 121A are connected to the openings 31, 32 respectively.

The outer tank 23B is formed in a substantially cylindrical shape with its upper surface open and its bottom surface closed, similarly to the inner tank 23A. An opening 33 through which the plating solution overflowing from the inner tank 23A flows into a later-described cathode-side storage region is formed in the bottom part of the outer tank 23B.

The driver 22 has a holder 34 which holds the wafer W and a motor 35 which rotates the wafer W together with the holder 34 on a substantially horizontal level.

A holder raising/lowering mechanism 36 which raises/lowers the holder 34 relative to the plating solution tank 23 is attached to the motor 35. Incidentally, the holder raising/lowering mechanism 36 in this embodiment raises/lowers the entire driver 22.

The holder raising/lowering mechanism 36 is composed of, for example, a support beam 37 which is attached to the motor 35 and which supports the driver 22, a guide rail 38 attached to an inner wall of the housing 21, and a vertically expansible/contractible cylinder 36 which raises/lowers the support beam 37 along the guide rail 38. By driving the cylinder 39, the driver 22 supported by the support beam 37 is raised/lowered along the guide rail 38.

Concretely, the holder 34 ascends/descends to move to the transfer position (I) where the wafer W is to be carried in/out, a cleaning position (II) where the plating applied onto the wafer W is to be cleaned, a spin-dry position (III) where spin dry to remove excessive plating solution and moisture from the plated wafer W is to be performed, and a plating position (IV) where the surface to be plated of the wafer W is to be plated. The wafer W held by the holder 34 located in the transfer position (I) and the cleaning position (II) is above the level of the plating solution when the inner tank 23A is filled with the plating solution. The wafer W held by the holder 34 located in the spin-dry position (III) and the plating position (IV) is under the level of the plating solution.

The holder 34 has a cylindrical holder container 40. One wafer W is accommodated in an inner space of the holder container 40 in a substantially horizontal state. An opening 41 through which the wafer W is to be carried into/out of the holder container 40 is formed in a sidewall of the holder container 40. A shutter 42 which opens/closes freely is provided near the opening 41. The shutter 42 is closed after the wafer W is carried in so that the opening 41 is covered, thereby preventing the plating solution from entering the inner space of the holder container 40.

A circular opening 43 which enables the surface to be plated of the wafer W to be in contact with the plating solution is formed in a bottom surface of the holder container 40. Here, the wafer W according to this embodiment is held by the holder 34 by a so-called facedown method, with its surface to be plated facing downward. The wafer W has on its surface to be plated a thin film made of the same substance as the plating, namely, a so-called seed layer, which is formed by a film forming unit disposed in a different system, for example, a PVD unit. By forming the seed layer on the wafer W, a voltage applied to the later-described cathode electrode 45 is also applied to the surface to be plated of the wafer W. Furthermore, trenches to form wiring therein and connection holes to serve for interlayer connection are formed on the surface to be plated of the wafer W.

A ring-shaped seal member 44 which is elastically deformed is provided on an inner bottom surface of the holder container 40. A later-described pressing member 50 presses the wafer W against the seal member 44 so that the seal member 44 is elastically deformed, thereby preventing the plating solution from entering the holder container 40.

The cathode electrode 45 to supply electricity to the surface to be plated of the wafer W is provided on the seal member 44. The cathode electrode 45 is electrically connected to a not-shown external power supply. On the cathode electrode 45, formed are hemisphere-shaped contacts 46 at positions of, for example, 128 equal parts into which the circumference is divided, being in contact with an outer circumferential part of the surface to be plated of the wafer W. The contacts 46 are formed in the hemisphere shape so that each of the contacts 46 is in contact with the wafer W at a substantially constant area.

A wafer raising/lowering mechanism 47 which holds the wafer W and raises/lowers the wafer W relative to the holder 34 extends from the inner space of the holder container 40 to a position above the motor 35. The wafer raising/lowering mechanism 47 is composed of, for example, an expansible/contractible chuck member 48 and a vacuum pump 49 which sucks an inner part of the chuck member 48.

Not-shown sucking grooves are formed, for example, in three places of the chuck member 48, and the vacuum pump 49 sucks the air inside the sucking grooves to attach the wafer W to the chuck member 48 by suction so that the wafer W is held by the chuck member 48. Incidentally, the chuck member 48 is structured to rotate with the holder 34 when the motor 35 is driven.

The wafer raising/lowering mechanism 47 raises/lowers the wafer W between a transfer position (i) where the wafer W is to be carried in/out and a holder holding position (ii) where the wafer W is to be held by the holder 34.

The pressing member 50 which presses the wafer W against the seal member 44 is provided in the inner space of the holder container 40. The pressing member 50 is formed in a ring shape and is structured to ascend/descend relative to the holder 34 when a not-shown pressing member raising/lowering mechanism is driven. The pressing member 50 is lowered to press the wafer W against the seal member 44 so that the seal member 44 is elastically deformed to seal a gap between the wafer W and the seal member 44.

Next, the plating solution storage tank 6 and an area around the plating solution storage tank 6 will be explained.

The inside of the plating solution storage tank 6 is divided into two parts by a partitioning plate 61. Concretely, it is divided into an anode-side storage region which stores the plating solution to be supplied to the anode-side region in the plating unit 2 and a cathode-side storage region which stores the plating solution to be supplied to the cathode-side region of the plating unit 2.

Here, the plating solution stored in the plating solution storage tank 6 will be explained. The plating solution stored in the plating solution storage tank 6 contains additives such as a retardant which suppresses the embedding of the plating, an accelerator which accelerates the embedding of the plating, and so on. The retardant is mainly composed of a high molecular compound and the accelerator is mainly composed of a sulfur compound.

The plating solution storage tank 6 is covered with a housing 7 which is made of a synthetic resin and which can maintain a substantially airtight condition. Openings 71, 72 are formed in two places of the housing 7 respectively. An inert gas supply system 8 which supplies an inert gas into the housing 7 is connected to the opening 71.

The inert gas supply system 8 is provided with an inert gas storage cylinder 81 which stores the inert gas such as nitrogen. A pipe 82 through which the inert gas in the inert gas storage cylinder 81 is supplied into the housing 7 is connected to the inert gas storage cylinder 81 and the housing 7. In the middle of the pipe 82, a valve 83 to adjust the flow rate of the inert gas is provided.

An inert gas exhaust system 9 which exhausts the inert gas out of the housing 7 is connected to the opening 72. The inert gas exhaust system 9 is mainly composed of a vacuum pump 91 and a pipe 92 connected to the vacuum pump 91 and the housing 7. The operation of the vacuum pump 91 causes the air or nitrogen inside the housing 7 to be exhausted from the housing 7.

A dissolved oxygen measuring unit 10 which measures the concentration of dissolved oxygen contained in the plating solution is provided on the periphery of the plating solution storage tank 6. The concentration of the dissolved oxygen contained in the plating solution is measured by the dissolved oxygen measuring unit 10 so that the concentration of the dissolved oxygen is accurately controlled.

The dissolved oxygen measuring unit 10 measures the concentration of the dissolved oxygen contained in the plating solution, utilizing a diaphragm polarographic method. Concretely, the dissolved oxygen measuring unit 10 is provided with not-shown anode electrode and cathode electrode. An oxidation reaction occurs in the anode electrode so that electrons are discharged. In the cathode electrode, a reduction reaction occurs so that the dissolved oxygen is reduced to ion hydroxide. These reactions cause an electric current to pass between the anode electrode and the cathode electrode. Since the amount of this electric current is proportional to the concentration of the dissolved oxygen, the concentration of the dissolved oxygen contained in the plating solution is measured by measuring this electric current.

A plating solution supply system 11 which supplies the plating solution in the plating solution storage tank 6 to the plating unit 2 is connected to the plating unit 2 and the plating solution storage tank 6. The plating solution supply system 11 is composed of an anode-side supply system 111 which supplies the plating solution in the anode-side storage region to the anode-side region and a cathode-side supply system 112 which supplies the plating solution in the cathode-side storage region to the cathode-side region.

The anode-side supply system 111 includes a pipe 111A whose one end is disposed in the anode-side storage region and other end is connected to the opening 31. A pump 111B which pumps out the plating solution in the anode-side storage region to send it to the anode-side region and a filter 111C which removes impurities from the plating solution pumped out by the pump 111B are provided in the middle of the pipe 111A.

Furthermore, a flowmeter 111D which measures the flow rate of the plating solution sent to the anode-side region and a flow rate control unit 111E electrically connected to the pump 111B and the flowmeter 111D are provided in the middle of the pipe 111A. The flowmeter 111D and the flow rate control unit 111E are provided in the middle of the pipe 111A so that the operation of the pump 111B is adjusted based on the flow rate measured by the flowmeter 111D to adjust the flow rate of the plating solution pumped out by the pump 111B.

The cathode-side supply system 112 includes a pipe 112A whose one end is disposed in the cathode-side storage region and other end is connected to the blowout pipe 28. A pump 112B which pumps out the plating solution in the cathode-side storage region to send it to the cathode-side region, a filter 112C, a flowmeter 112D, and a flow rate control unit 112E are provided in the middle of the pipe 112A.

A plating solution drainage system 12 which drains out the plating solution used in the plating unit 2 and has the plating solution flow into the plating solution storage tank 6 is connected to the plating unit 2 and the plating solution storage tank 6. The plating solution drainage system 12 is composed of an anode-side drainage system 121 which drains out the plating solution from the anode-side region and has the plating solution flow into the anode-side storage region and a cathode-side drainage system 122 which drains out the plating solution from the cathode-side region and has the plating solution flow into the cathode-side storage region.

The anode-side drainage system 121 is mainly composed of a pipe 121A, with one end thereof connected to the opening 32 and the other end thereof disposed in the anode-side storage region. The cathode-side drainage system 122 is mainly composed of a pipe 122A, with one end thereof connected to the opening 33 and the other end thereof disposed in the cathode-side storage region, and a filter 122B.

A plating solution stirring system 13 which stirs the plating solution is connected to the plating solution storage tank 6. The plating solution stirring system 13 is composed of an inter-anode/cathode stirring system 131 which stirs the plating solution between the cathode-side storage region and the anode-side storage region, an anode-side stirring system 132 which stirs the plating solution in the anode-side storage region, and a cathode-side stirring system 133 which stirs the plating solution in the cathode-side storage region.

The inter-anode/cathode stirring system 131 includes a pipe 131A with one end thereof disposed in the anode-side storage region and the other end thereof disposed in the cathode-side storage region. A pump 131B which pumps out the plating solution in the anode-side storage region to sent it to the cathode-side storage region, a filter 131C, a flowmeter 131D, and a flow rate control unit 131E are provided in the middle of the pipe 131A.

Here, when the cathode-side storage region is filled with the plating solution, the plating solution overflows from the cathode-side storage region to flow into the anode-side storage region. The plating solution thus flows in/out between the anode-side storage region and the cathode-side storage region so that the plating solution is stirred between the cathode-side storage region and the anode-side storage region.

The anode-side stirring system 132 includes a pipe 132A which is so connected to the plating solution storage tank 6 that both ends thereof are positioned in the anode-side storage region. A pump 132B which pumps out the plating solution in the anode-side storage region to send it to the anode-side storage region, a filter 132C, a flowmeter 132D, and a flow rate control unit 132E are provided in the middle of the pipe 132A.

The cathode-side stirring system 133 includes a pipe 133A which is so connected to the plating solution storage tank 6 that both ends thereof are positioned in the cathode-side storage region. A pump 133B which pumps out the plating solution in the cathode-side storage region to send it to the cathode-side storage region, a filter 133C, a flowmeter 133D, and a flow rate control unit 133E are provided in the middle of the pipe 133A.

In the middle of each of the pipes 111A, 112A, 131A, 132A, 133A, a dissolved oxygen removing unit 14 which removes the dissolved oxygen contained in the plating solution is provided.

Figure 4:
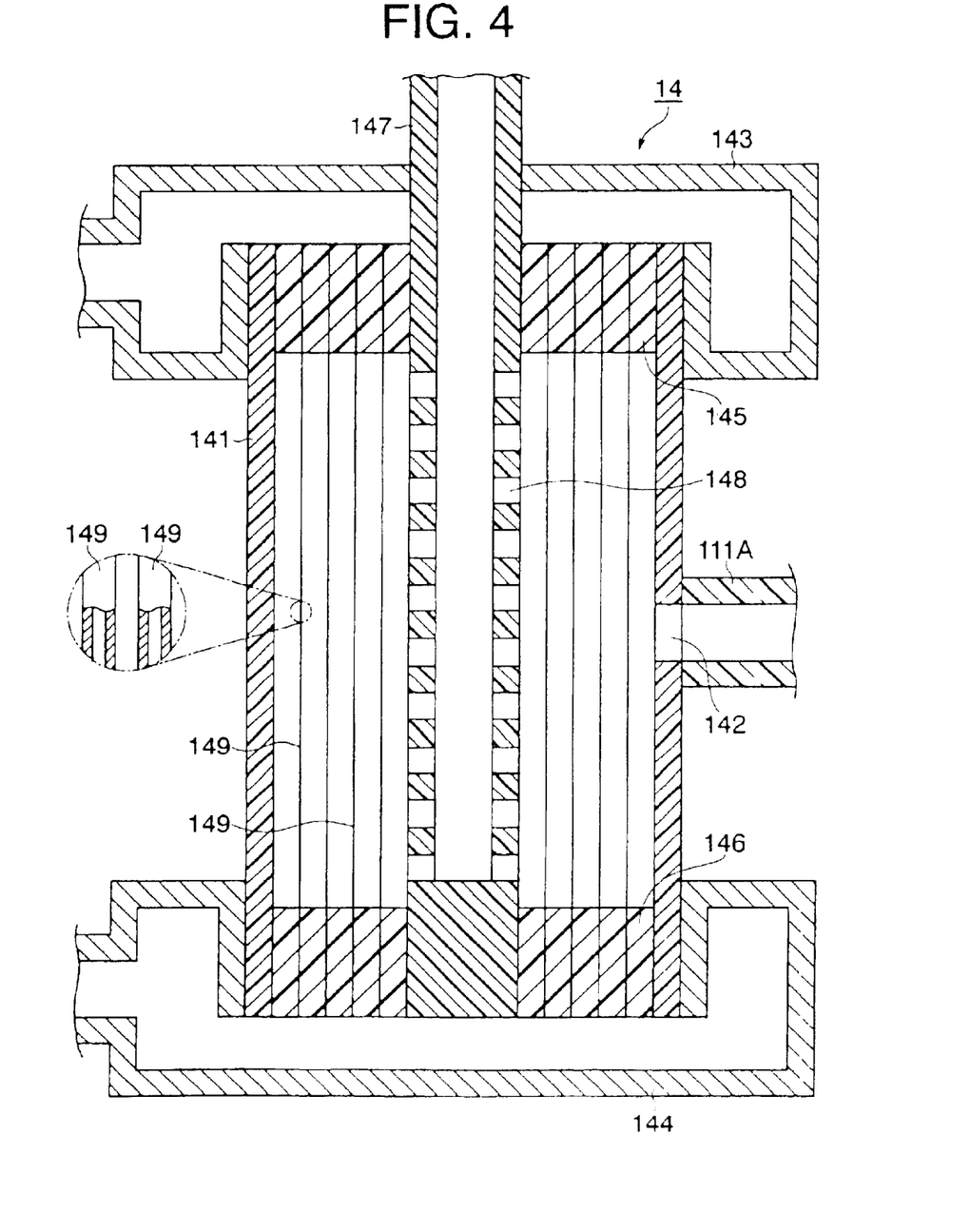
FIG. 4 is a view schematically showing the structure of a dissolved oxygen removing unit according to the embodiment.

FIG. 4 is a view schematically showing the structure of the dissolved oxygen removing unit 14 according to this embodiment. Note that FIG. 4 shows the dissolved oxygen removing unit 14 provided in the middle of the pipe 111A. As shown in FIG. 4, the dissolved oxygen removing unit 14 has a cylindrical container 141 whose upper surface and bottom surface are open. An opening 142 allowing the plating solution from which the dissolved oxygen is removed to flow out therethrough to an external region is formed in a side surface of the cylindrical container 141. The pipe 111A is connected to a peripheral portion of the opening 142.

Covers 143, 144 which cover an upper part and a bottom part of the cylindrical container 141 are provided on an outer side of the upper part and an outer side of the bottom part of the cylindrical container 141 respectively. A not-shown vacuum pump is connected to the covers 143, 144. The operation of this vacuum pump causes the pressure inside the covers 143, 144 to be lower.

Seal members 145, 146 which seal an inner space of the cylindrical container 141 are provided on an inner side of the upper part and the inner side of the bottom part of the cylindrical container 141 respectively. Furthermore, a plating solution supply pipe 147 which supplies the plating solution into the cylindrical container 141 is inserted into the cylindrical container 141. One end of the plating solution supply pipe 147 is connected to the pipe 111A and the other end thereof is buried in the seal member 146. A plurality of openings 148 which allows the plating solution to flow out therethrough are formed in a portion, which is positioned inside the cylindrical container 141, of the plating solution supply pipe 147.

A plurality of hollow fiber membranes 149 having a hydrophobic property and gas permeability are provided in a vertical direction inside the cylindrical container 141. Concretely, the hollow fiber membranes 149 are arranged in a circle to surround the plating solution supply pipe 147. Incidentally, the hollow fiber membranes 149 form a plurality of circles and they surround the plating solution supply pipe 147 in multiple circles. The hollow fiber membranes 149 pass through the seal members 145, 146 so that both of end portions of the hollow fiber membranes 149 are exposed in the covers 143, 144. Since both of the end portions of the hollow fiber membranes 149 are exposed in the covers 143, 144, the pressure inside the hollow fiber membranes 149 is reduced when the aforesaid vacuum pump is operated.

In order to remove the dissolved oxygen contained in the plating solution by the dissolved oxygen removing unit 14, the aforesaid vacuum pump is operated to reduce the pressure in the hollow fiber membranes 149. This causes the dissolved oxygen contained in the plating solution flowing from the openings 148 to be sucked into the hollow fiber membranes 149 so that the dissolved oxygen contained in the plating solution is removed. Incidentally, the plating solution usually contains the dissolved oxygen of about 10 mg/L, which can be reduced to about 2 mg/L or lower by the dissolved oxygen removing unit 14.

Figure 5:
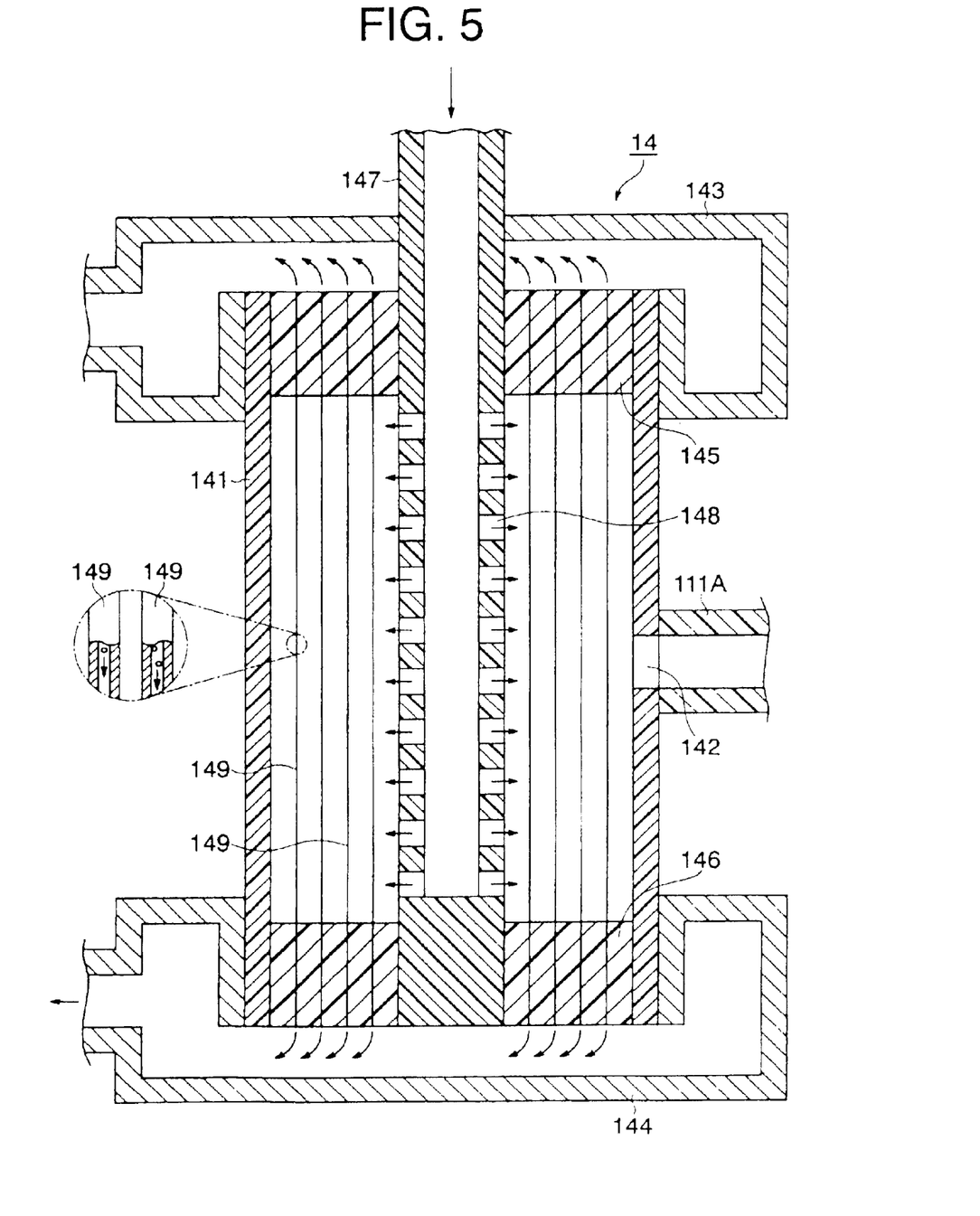
FIG. 5 is a view schematically showing the inside of the dissolved oxygen removing unit while a plating solution according to the embodiment is supplied.

Processes carried out in the plating system 1 will be explained below. FIG. 5 is a view schematically showing the inside of the dissolved oxygen removing unit 14 while the plating solution according to this embodiment is supplied, and FIG. 6 is a flow chart showing the flow of processes carried out in the plating unit 2 according to this embodiment.

First, the valve 83 is opened so that the inert gas is supplied into the housing 7 from the inert gas storage cylinder 81. Consequently, the inside of the housing 7 is filled with the inert gas.

Next, the pumps 111B, 121B, 131B, 132B, 133B are operated so that the plating solution is supplied to each of the anode-side region and the cathode-side region and at the same time it is stirred. Furthermore, the aforesaid vacuum pump is operated so that the dissolved oxygen contained in the plating solution flowing out of the openings 148 is removed as shown in FIG. 5. Incidentally, the dissolved oxygen sucked into the hollow fiber membranes 149 is discharged out of the dissolved oxygen removing unit 14 via the covers 143, 144.

Figure 6:
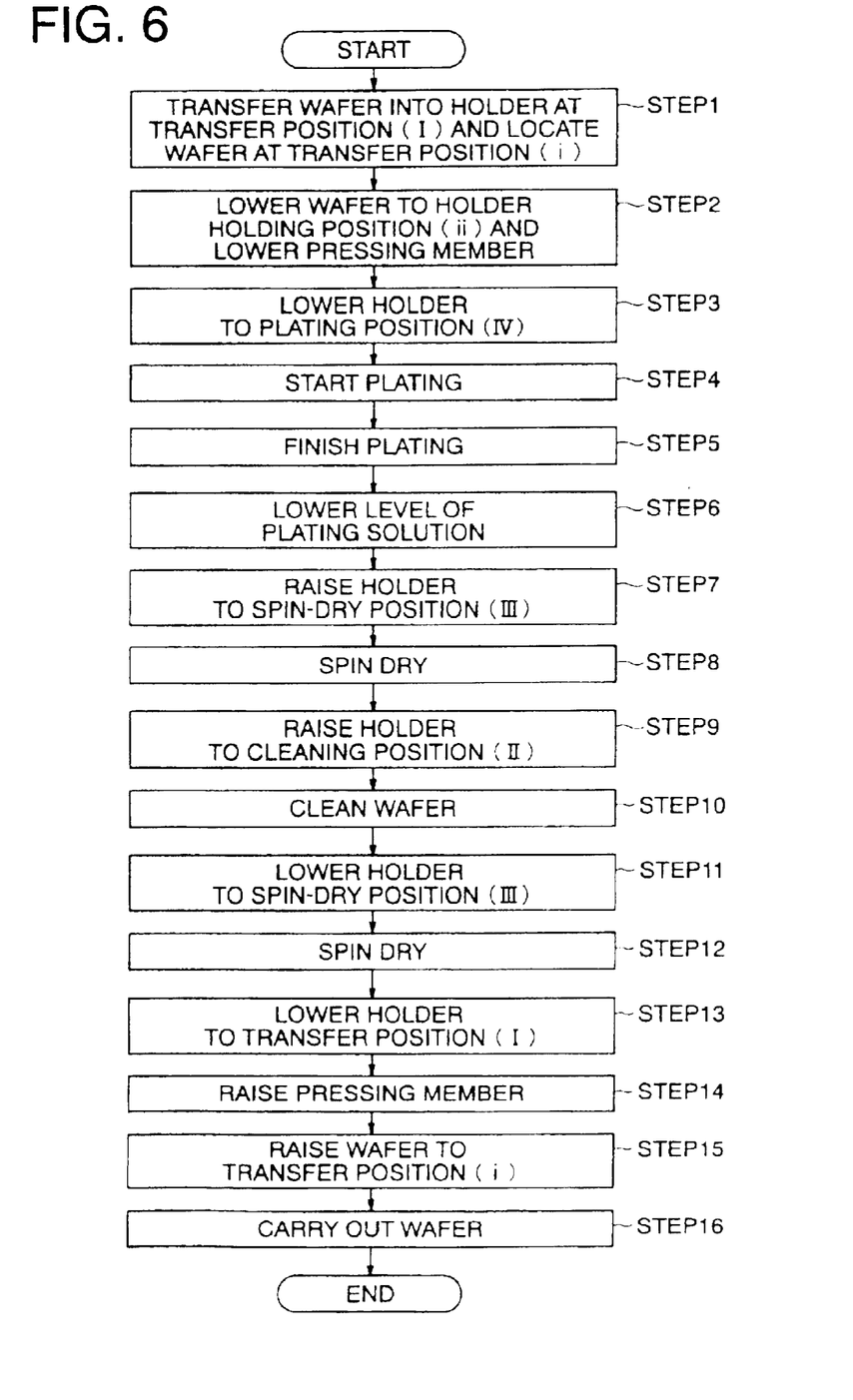
FIG. 6 is a flow chart showing the flow of processes carried out in the plating unit according to the embodiment.

Thereafter, while this state is maintained, the wafer W is plated according to the flow shown in FIG. 6 (STEP 1 to STEP 16).

In this embodiment, the dissolved oxygen is removed from the plating solution so that the reduction in embedding speed is suppressed to decrease the frequency of replacing the plating solution. In other words, consumption of the additives contained in the plating solution is considered to be one of the causes for lowering the embedding speed as is previously stated. To be concrete, it is considered to be one of the causes that the accelerator contained in the plating solution is oxidized due to the dissolved oxygen contained in the plating solution and it loses the function as the accelerator. In this embodiment, the dissolved oxygen contained in the plating solution is removed so that the oxidization of the accelerator contained in the plating solution is suppressed. Therefore, the reduction in the embedding speed is suppressed to lengthen the life of the plating solution. This decreases the frequency of replacing the plating solution.

Furthermore, the removal of the dissolved oxygen contained in the plating solution is especially effective in the case where the plating solution is caused to overflow from the inner tank 23A as in this embodiment. The reason is that, in the case where the plating solution is caused to overflow from the inner tank 23A, the amount of the dissolved oxygen contained in the plating solution is increased since the area of the plating solution in contact with the air becomes large at the time the plating solution overflows from the inner tank 23A.

In this embodiment, the inside of the housing 7 is filled with the inert gas so that the amount of the dissolved oxygen contained in the plating solution is decreased compared with a case when the plating solution in the plating solution storage tank 6 is in contact with the air. Specifically, by filling the inside of the housing 7 with the inert gas, the amount of the air in contact with the plating solution is reduced. This reduces the amount of oxygen taken into the plating solution in the plating solution storage tank 6. Consequently, the amount of the dissolved oxygen contained in the plating solution is decreased.

It is to be understood that the present invention is not limited to the described content of the above embodiment, and the structure, material, disposition of each of the members, and so on are allowed be changed appropriately without departing from the spirit of the present invention. In the above-described embodiment, the dissolved oxygen removing unit 14 is provided both in the plating solution supply system 11 and the plating solution stirring system 13 but it may be provided in either one of them.

In the above-described embodiment, the dissolved oxygen removing unit 14 is provided both in the anode-side supply system 111 and the cathode-side supply system 112, but it may be provided in either one of them. Moreover, the dissolved oxygen removing unit 14 is provided in all of the pipes 131A, 132A, 133A of the inter-anode/cathode stirring system 131, the anode-side stirring system 132, and the cathode-side stirring system 133, but it does not need to be provided in all of the pipes 131A, 132A, 133A.

In the above-described embodiment, the wafer W is used, but an LCD glass substrate is usable.

What is claimed is:

1. A solution treatment system, comprising:
    a solution treatment unit which includes a treatment solution tank to store a treatment solution and a pair of electrodes and which gives a solution treatment to a substrate;
    a treatment solution storage tank which stores the treatment solution;
    a treatment solution supply system which supplies the treatment solution stored in said treatment solution storage tank to said solution treatment unit;
    a treatment solution stirring system which stirs the treatment solution stored in said treatment solution storage tank; and
    a dissolved oxygen removing unit which is disposed in said treatment solution stirring system configured to removes dissolved oxygen from the treatment solution flowing through said treatment solution stirring system.

2. A solution treatment system according to claim 1, further comprising:

a housing accommodating said treatment solution storage tank; and an inert gas supply system which supplies an inert gas into an inner part of said housing.

3. A solution treatment system according to claim 1, further comprising:

a dissolved oxygen measuring unit which measures concentration of the dissolved oxygen contained in the treatment solution.

4. A solution treatment system according to claim 1, wherein the treatment solution contains an additive.

5. A solution treatment system according to claim 1, wherein the treatment solution is a plating solution.

6. A solution treatment system, comprising:

a solution treatment unit which includes a treatment solution tank to store a treatment solution and a pair of electrodes and which gives a solution treatment to a substrate;

a treatment solution storage tank which stores the treatment solution;

a first dissolved oxygen removing unit configured to remove dissolved oxygen from the treatment solution stored in said treatment solution storage tank;

a treatment solution supply system which supplies the treatment solution stored in said treatment solution storage tank to said solution treatment unit;

a second dissolved oxygen removing unit which is disposed in said treatment solution supply system, configured to remove dissolved oxygen from the treatment solution flowing through said treatment solution supply system; and a treatment solution stirring system which stirs the treatment solution stored in said treatment solution storage tank, wherein the first dissolved oxygen removing unit is disposed in said treatment solution stirring system and removes the dissolved oxygen from the treatment solution flowing through said treatment solution stirring system.

7. A solution treatment method, comprising:

removing dissolved oxygen from a treatment solution in a treatment solution storage tank;

supplying a treatment solution to a treatment solution tank from the treatment solution storage tank;

removing dissolved oxygen from the treatment solution supplied to the treatment solution tank;

contacting a substrate with the treatment solution supplied to the treatment solution tank and passing an electric current through the substrate to give a solution treatment to the substrate; and stirring the treatment solution stored in the treatment solution storage tank, wherein said removing of dissolved oxygen from the treatment solution in the treatment solution storage tank is carried out when the treatment solution in the treatment solution storage tank is stirred.

* * * * *